July 7, 1970
J. E. ROTHER
3,519,044
RING-TYPE LOG DEBARKER
Filed March 14, 1968
3 Sheets-Sheet 1
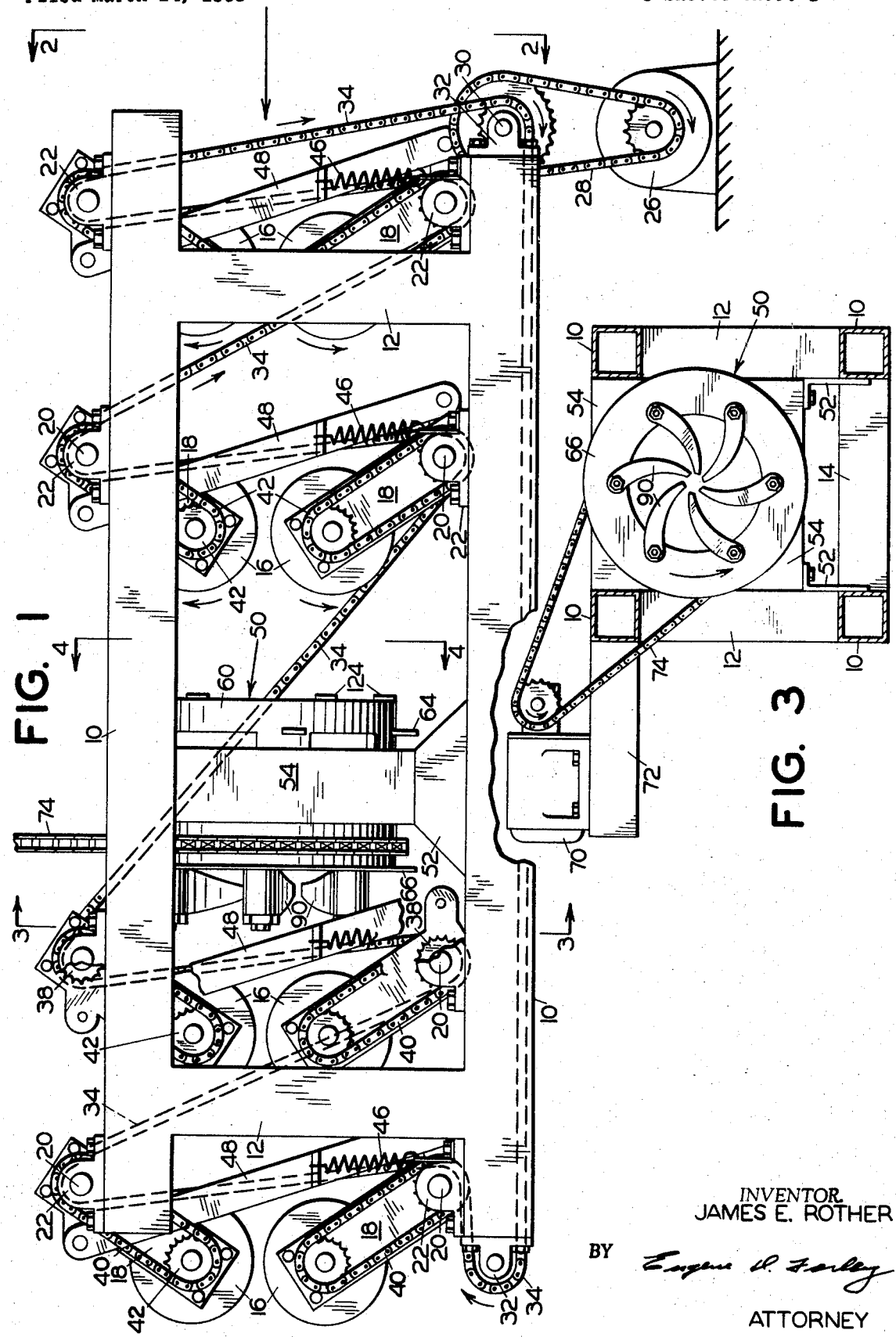
INVENTOR
JAMES E. ROTHER
BY
ATTORNEY July 7, 1970  J. E. ROTHER  3,519,044
RING-TYPE LOG DEBARKER
Filed March 14, 1968  3 Sheets-Sheet 2

INVENTOR.
JAMES E. ROTHER
BY Eugene D. Farley
ATTORNEY

July 7, 1970 J. E. ROTHER 3,519,044
RING-TYPE LOG DEBARKER

Filed March 14, 1968 3 Sheets-Sheet 3

INVENTOR.
JAMES E. ROTHER
BY
*Eugene D. Farley*
ATTORNEY

United States Patent Office 3,519,044
Patented July 7, 1970

3,519,044
RING-TYPE LOG DEBARKER
James E. Rother, 8925 SW. 40th,
Portland, Oreg. 97219
Filed Mar. 14, 1968, Ser. No. 713,138
Int. Cl. B27l 1/00
U.S. Cl. 144—208                            9 Claims

ABSTRACT OF THE DISCLOSURE

A log debarker comprises a debarking ring and a conveyor for moving logs endwise therethrough. The ring mounts a plurality of cutting assemblies, each comprising a transverse shaft, preferably a torsion bar, and a debarking cutter fixed on one end of the shaft. The cutter is movable angularly with rotation of the shaft between advanced and retracted positions as required to follow the contour of the log. A suitable linkage is fixed to the other end of the shaft and connects with a pivotally mounted weighted arm or other centrifugal force-exerting member. A shock absorber interconnects the linkage and the ring. Rotation of the ring causes the centrifugal force-exerting members to fly outwardly, advancing the cutters toward the center of the ring. As the log enters the ring, the cutters are forced apart, but, pressed by the centrifugal force members, follow the contour of the log and debark it efficiently. The shock of impacts with knots, burls and other irregularities is absorbed in part by the torsion bar and in part by the shock absorber.

---

This invention relates to ring-type log debarkers.

Ring-type log debarkers are well known. They consist broadly of a rotating ring provided with internally extending, retractable cutters and a conveyor for passing logs endwise through the ring. As the ring rotates, the knives debark the log.

Although ring-type debarkers are used widely, their use is attended by serious disadvantages. They operate inefficiently on logs of irregular contour, since the knives cannot follow the contour changes caused by knots and burls. The shock of impact of the knives with the areas projecting from the logs causes breakage and failure of the assembly. The debarkers vibrate badly. In addition, they are complicated, expensive and difficult to operate.

It accordingly is the general purpose of the present invention to provide a ring-type log debarker which debarks logs efficiently, even though the logs are marred by the presence of burls and knots and are of irregular contour; which overcomes the problems caused by the shock of impact between the cutters and log irregularities; which operates smoothly and is substantially vibration free; which adjusts itself automatically to logs of different sizes and contours; which does not require special operators; which operates at a speed three times the speed of conventional debarkers; which costs only about one-fifth as much as conventional debarkers; which is easy to maintain; and which, by eliminating slab wood waste burners and attendant fire hazard makes it possible to move small sawmills out into the woods, with attendant economies of operation.

The manner in which the foregoing and other objects of the invention are accomplished will be apparent from the accompanying specification and claims considered together with the drawings wherein:

FIG. 1 is a view in side elevation of the herein described log debarking apparatus;

FIG. 3 is a transverse sectional view taken along line 3—3 of FIG. 1;

Figures 2, 6:
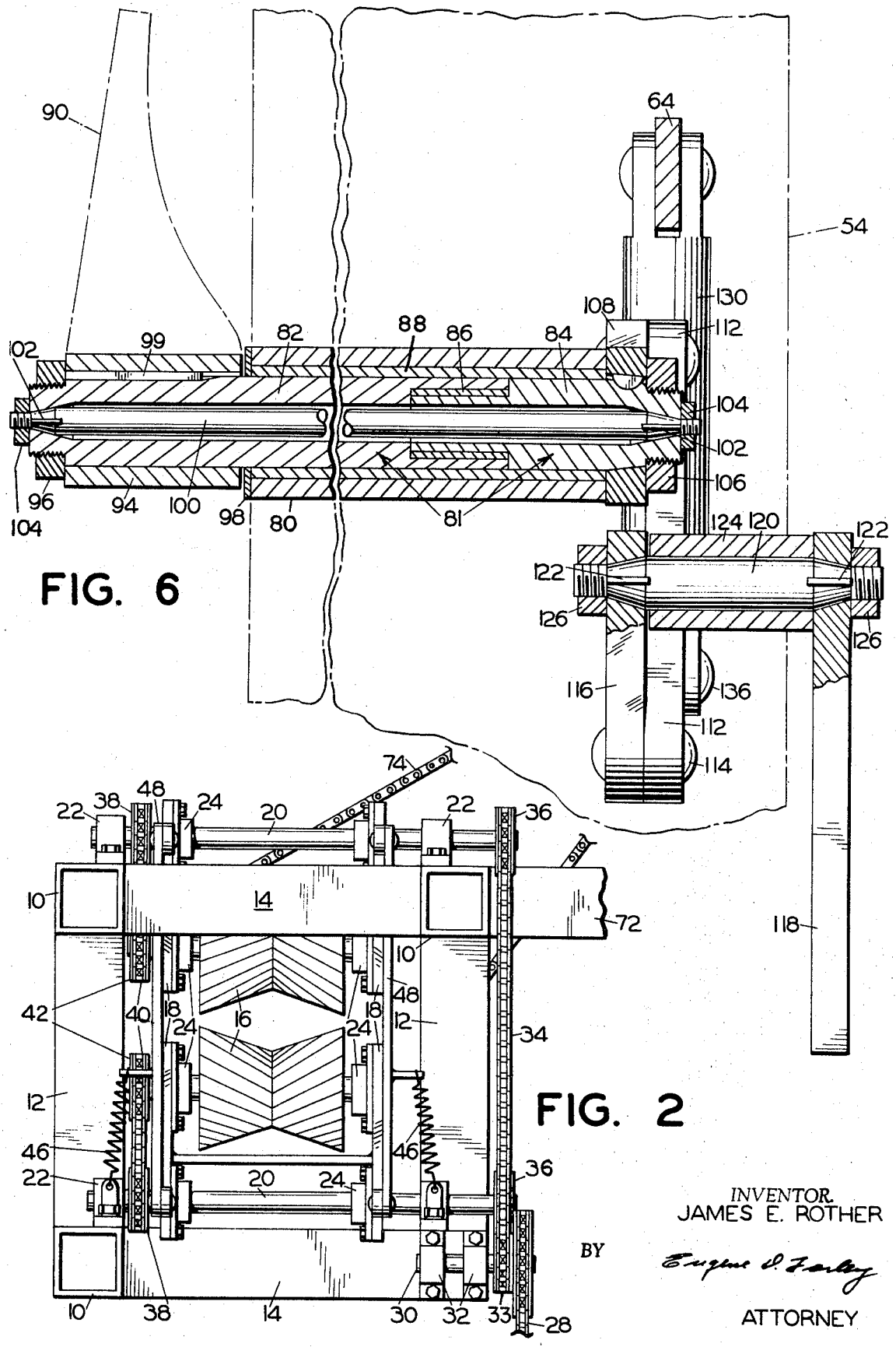
FIG. 2 is a view in end elevation looking in the direction of the arrows of line 2—2 of FIG. 1.
FIG. 6 is a detail sectional view taken along line 6—6 of FIG. 4.

Generally stated, the log debarking apparatus of my invention comprises a log debarking ring and a conveyor for moving logs therethrough. The ring mounts a plurality of debarker cutting assemblies. Each comprises a transverse shaft, preferably a torsion bar, and a debarking cutter fixed on one end of the shaft. The cutter is movable angularly with rotation of the shaft between advanced and retracted positions as required to follow the contour of the log.

A suitable linkage is fixed to the other end of the shaft and connects with a pivotally mounted, weighted arm or other centrifugal force-exerting member. A shock absorber interconnects the linkage and the ring.

In operation the rotation of the ring causes the centrifugal force-exerting members to fly radially outwardly, advancing the cutters. As the log enters the ring, the cutters are forced apart, but, pressed by the force of the centrifugal force members, follow closely the contour of the log, whatever it may be. The shock of impact with knots, burls and other irregularities is absorbed in part by the torsion bar and in part by the shock absorber. Thus the log is debarked rapidly and efficiently without damage to the apparatus or hazard to the operating personnel.

Considering the foregoing in greater detail and with particular reference to the drawings:

As shown in FIG. 1, the log debarking apparatus of my invention is mounted on a frame which is compact and sturdy and makes possible moving the apparatus from place to place as an integral unit. The frame consists basically of upper and lower longitudinal stringers 10, vertical posts 12, and horizontal cross pieces 14. All of these members may be made of welded box beam construction to provide a structure strong enough to withstand the rigorous treatment to which it is subjected.

Mounted on the frame is a log conveyor unit which passes logs endwise through the ring debarking unit.

The log conveying unit comprises a plurality of spaced drive rolls 16 arranged in opposed pairs. Preferably the drive rolls have the inwardly tapered construction shown in FIG. 2 to render them self-centering.

The drive rolls are suspended between pairs of arms 18. The inner ends of the arms pivotally are mounted on shafts 20, journaled in bearings 22.

The outer ends of arms 18 mount bearings 24 which rotatably mount the shafts of rolls 16.

A suitable drive is provided for driving all of the drive rolls in unison.

A motor 26 drives through a chain and sprocket assembly 28 a shaft 30 journaled in bearings 32 mounted on one of cross pieces 14. Drive shaft 30 mounts a sprocket 33 which engages and drives a long chain 34. Chain 34 meshes with sprockets 36 on shafts 20. The latter shafts mount sprockets 38 which mesh with short chains 40. The latter engage sprockets 42 on the ends of the drive roll shafts. Accordingly all of the drive rolls may be driven in unison, in the feed direction, and at the same speed.

In addition, the drive rolls float on arms 18 so that they may accommodate logs of different diameter. They are maintained resiliently in their positions of closest approach to each other by spring assemblies including springs 46, and the tie bars 48.

The log-conveying assembly thus provided cooperates with a debarking ring, indicated generally at 50.

The ring debarking unit is mounted on a pedestal 52 which in turn is supported between frame stringers 10.

Figure 5:
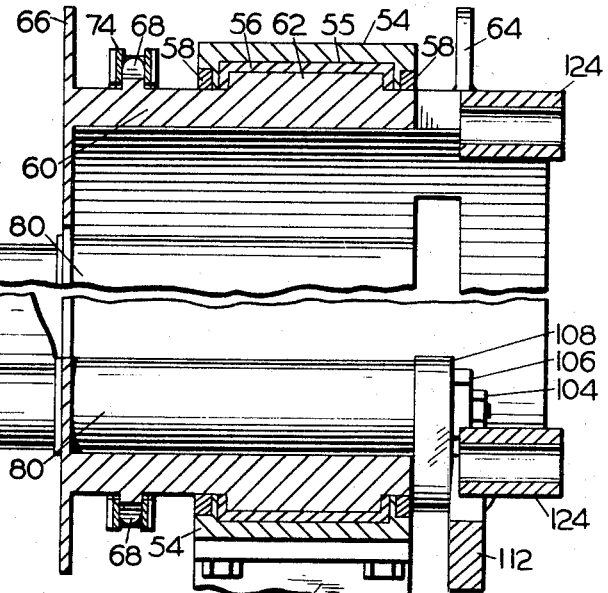
FIG. 5 is a fore-shortened longitudinal sectional view taken along line 5—5 of FIG. 4.

The unit is contained in a housing 54 having a circular opening provided with an annular recess 55. A bushing 56 is seated in the recess, as are oil seal members 58, FIG. 5.

Rotatably mounted within the frame thus provided is a rotor 60 having an annular peripheral guide 62. The latter is received in bushing 56 in the housing and thus retains and guides the rotor in its rotational travel.

Rotor 60 also is provided with a plurality of perforated tabs 64, a flange 66, which serves as a bark shield, and a large sprocket 68 to which the drive is connected.

As shown in FIG. 3, the drive for the rotor consists of a motor 70 mounted on a pedestal 72 connected to frame member 10. The motor drives a chain 74 which meshes with sprocket 68.

Rotor 60 also supports the resiliently weighted cutter assemblies which are a particular feature of the invention. The construction of these assemblies is shown particularly in FIGS. 4 and 6.

As shown in those figures, there are six debarking cutter assemblies equally spaced about the inner periphery of the rotor. Each is housed in a transverse sleeve 80. The sleeve in turn houses a shaft which preferably comprises a torsion bar.

The torsion bar construction, shown particularly in FIG. 6, includes a segmental tube 81 comprised of segments 82, 84. The meeting ends of these segments are overlapped and separated by a bushing 86. Since the tube rotates as a unit, it is journaled in a bushing 88.

Segment 82 of hollow shaft 81 mounts a debarking cutter 90 of suitable contour and bearing at its outer end a suitably designed blade 92.

The inner end of cutter 90 is integral with a hub 94 which is keyed to the outwardly-extending projecting end of hollow shaft segment 82. The outer end of the segment is threaded and mounts a nut 96 which holds the cutter removably in place. A thrust bearing 98 is interposed between hub 94 and the end of sleeve 80. A key 99 keys the cutter hub to the hollow shaft segment.

A torsion bar 100 is received in the hollow interior of composite shaft 81. It may be of the usual torsion bar spring steel construction. Its ends are tapered and are keyed to the outer ends of the respective hollow shaft segments by means of keys 102. The extremities of the torsion bar project beyond the ends of the hollow shaft segments and are threaded. The threaded segments receive nuts 104, by means of which the torsion bar releasably is secured in its operative position.

Figure 4:
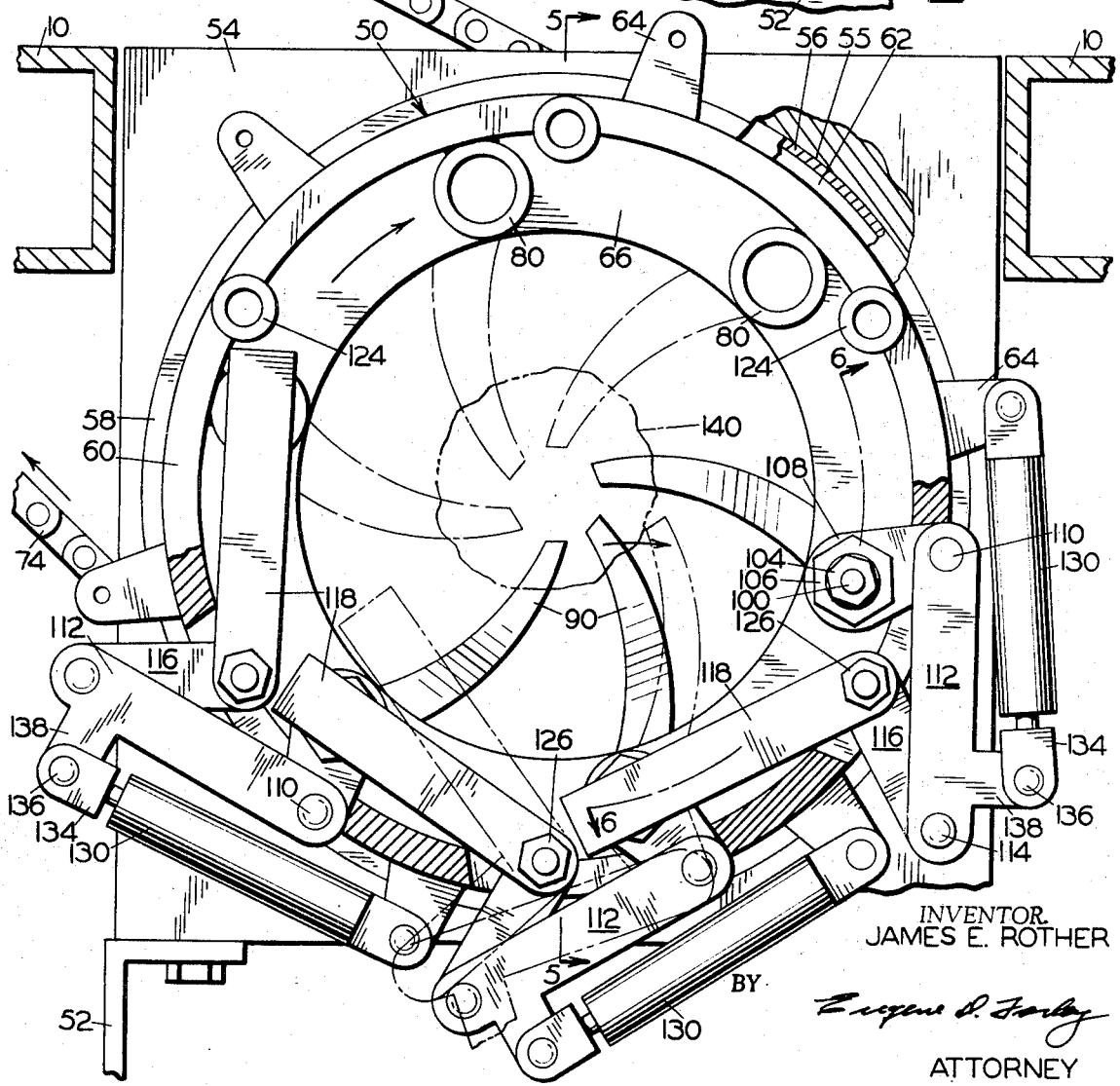
FIG. 4 is an enlarged transverse sectional view taken along line 4—4 of FIG. 1.

The end of torsion bar 100 remote from cutter 90 is connected to a centrifugal weight element through a linkage, the construction of which also is shown in FIGS. 4 and 6.

A nut 106 holds in place a short lever 108 which extends radially from the torsion bar assembly. The outer end of the lever is connected through a pivot pin 110 to one end of a link 112. The other end of link 112 is connected through a pivot pin 114 to a composite bell crank lever assembly.

The latter assembly includes an arm 116 and an arm 118 keyed to the opposite ends of a short tapered shaft 120 by means of keys 122. The shaft is journaled in a sleeve 124 which is fixed to rotor 60.

The outer ends of shaft 120 are threaded and receive nuts 126 by means of which the bell crank lever assembly is assembled.

Arm 118 of the lever assembly is weighed and arranged more or less tangentially to rotor 60 so that as the rotor rotates, centrifugal force will tend to move the arm radially outwardly.

Shock absorbing means are provided which cooperate with the torsion bar in absorbing the shock produced by cutter impact. The construction and location of this element of the unit is also shown in FIGS. 4 and 6.

The shock absorber is indicated generally at 130. It may be of one of several classes. Preferably it is of the spring-loaded, single-acting hydraulic cylinder type employed in automobile construction.

The base of the shock absorber is pivotally connected to a tab 64 which extends outwardly from rotor 60. The piston rod of shock absorber 130 is connected to a cross head 134 which, in turn, is coupled through pivot pin 136 to a lateral extension 138 of link 112.

OPERATION

The operation of the herein described log debarker is as follows:

A log 140 is passed endwise along drive rolls 16. It enters debarking ring 50 and by its progress pushes apart debarking cutters 90. These act independently and as a diaphragm to follow the irregular log contour.

As rotor 60 housed in the debarking ring rotates clockwise, as viewed in FIG. 4, the debarking knives are drawn across the surface of the log and remove the bark. Contemporaneously, centrifugal weighted arms 118 are driven outwardly, radially and, acting through the linkages including arm 116, link 112, lever 108 and torsion bar 100, maintain a sensitive resilient pressure on the cutters.

The pressure thus exerted is so sensitive that the cutters easily follow down the back sides of knots and burls, barking them completely. They also will follow the contour of oval logs and other irregularly shaped logs to debark them efficiently. The impact caused by pounding of the knife blades against log irregularities is absorbed in part by torsion bar 100 and in part by shock absorbers 130. This enables the apparatus to run without vibration at a high speed, making possible a production rate not heretofore obtainable.

It is to be understood that the form of my invention herein shown and described is to be taken as an illustrative example of the same and that various changes in the shape, size and arrangement of parts may be resorted to without departing from the spirit of my invention.

Having thus described my invention, I claim:
1. A ring-type log debarker comprising:
 (a) a rotatably mounted ring-type frame,
 (b) drive means connected to the frame for rotating the same at a predetermined speed,
 (c) conveyer means arranged for feeding logs endwise through the frame, and
 (d) mounted at spaced intervals peripherally on the frame a plurality of debarking cutter assemblies, each assembly comprising
  (1) shaft means journaled in the frame transversely thereof,
  (2) debarking cutter means fixed on one end of the shaft means and extending radially inward of the frame,
  (3) the cutter means being movable angularly with rotation of the shaft means between advanced and retracted positions as required to follow the irregular contour of the logs,
  (4) a weighted centrifugal force-exerting member,
  (5) pivot means mounting the weighted member on the frame, and
  (6) link means pivotally interconnecting the shaft means and pivot means, whereby during rotation of the frame the weighted member exerts a centrifugal force opposing movement of the cutter means to its retracted position.
2. The debarker of claim 1 wherein the shaft means comprises torsion bar means.
3. The debarker of claim 1 including shock absorber means interconnecting the link means and the frame.
4. The debarker of claim 3 wherein the shock absorber means comprises a spring-pressed, single-acting, shock-absorbing hydraulic cylinder.
5. The debarker of claim 1 wherein the conveyer means comprises a longitudinally extending frame, a plurality of upper and lower lever arms pivotally mounted at one of their ends to the frame, a plurality of upper and lower drive rolls rotatably mounted, respectively, on the upper and lower lever arms and disposed on opposite sides of the cutter assemblies, drive means interconnecting all of the rolls for rotating them simultaneously in the feed direction, and resilient means connected to the upper and lower lever arms for urging them toward each other.

6. A ring-type log debarker comprising:
 (a) a rotatably mounted ring-type frame,
 (b) drive means connected to the frame for rotating the frame at a predetermined speed,
 (c) conveyer means arranged for feeding logs endwise through the frame, and
 (d) mounted at spaced intervals peripherally on the frame a plurality of debarking cutter assemblies, each assembly comprising
  (1) torsion bar shaft means journaled in the frame transversely thereof and comprising an outer tube divided longitudinally into two segments, a torsion bar connected to the segments and having threaded ends extending completely through the tube and projecting outwardly therefrom, and nut means threaded on the threaded ends of the torsion bar and bearing against the tube for mounting the torsion bar therein,
  (2) debarking cutter means secured on one end of one of the tube segments and extending radially inwardly of the frame,
  (3) the cutter means being movable angularly with rotation of the shaft means between advanced and retracted positions as required to follow the irregular contour of the logs,
  (4) link means fixed on the other of the tube segments, and
  (5) a weighted centrifugal force-exerting member pivotally connected at one of its ends to the link means and arranged to exert, during rotation of the frame, centrifugal force opposing movement of the cutter means to its retracted position.

7. The debarker of claim 6 wherein the inner end of the cutter means is provided with a hub dimensioned to receive one end of the tube, key means keying the hub to the tube, and clamp means clamping the hub thereto.

8. The debarker of claim 6 wherein the link means comprises a first lever fixed at one of its ends to the end of the tube, a first link pivoted at one of its ends to the other end of the first lever, a bell crank lever pivotally mounted on the frame, and second pivot means pivotally connecting the other end of the link to the bell crank lever.

9. The debarker of claim 8 wherein the centrifugal force-exerting member comprises a weighted end of the bell crank lever.

References Cited

UNITED STATES PATENTS

| | | | |
|---|---|---|---|
| 2,692,623 | 10/1954 | Leffler | 144—205.5 |
| 2,779,363 | 1/1957 | Laughton | 144—208.5 |
| 2,794,466 | 6/1957 | Leffler | 144—208.5 |
| 2,855,010 | 10/1958 | Leffler | 144—208.5 |
| 3,098,512 | 7/1963 | Kendrick | 144—208.5 |
| 3,108,622 | 10/1963 | Kendrick | 144—208.5 |

GIL WEIDENFELD, Primary Examiner